June 19, 1951 J. V. CAPUTO 2,557,075
VERTICAL-SHAFT DYNAMO-ELECTRIC MACHINE
Filed July 26, 1948
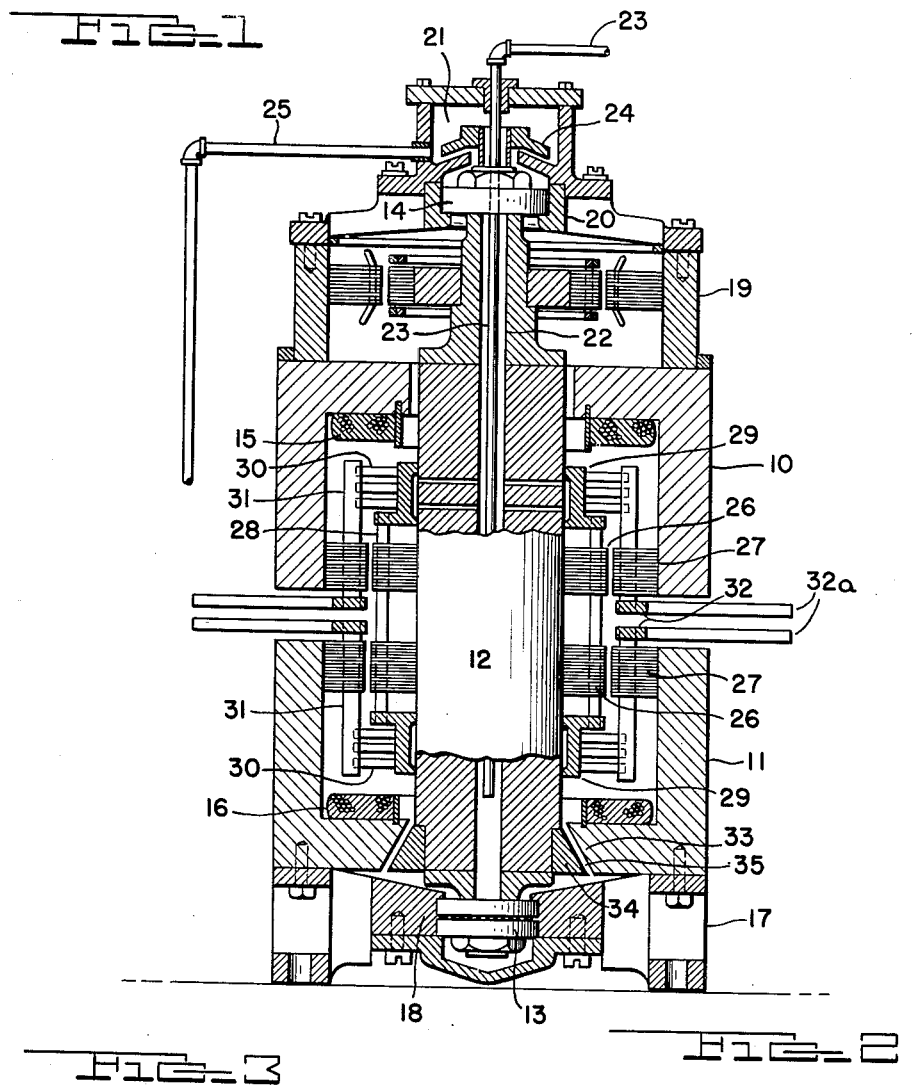
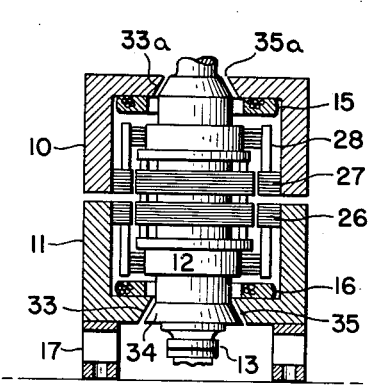
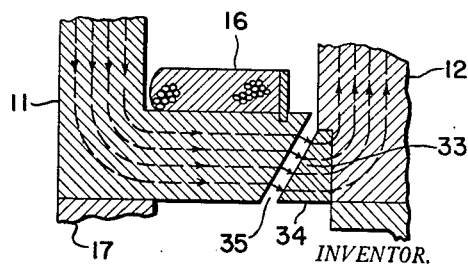
INVENTOR.
JAMES V. CAPUTO
BY
Christy, Parmelee & Strickland
ATTORNEYS Patented June 19, 1951

2,557,075

UNITED STATES PATENT OFFICE 2,557,075

VERTICAL-SHAFT DYNAMOELECTRIC MACHINE

James V. Caputo, Youngstown, Ohio

Application July 26, 1948, Serial No. 40,687

9 Claims. (Cl. 171—212)

This invention relates to dynamo-electric machines having a vertical shaft and, in particular, to an improved field construction whereby the rotor is magnetically suspended, improved means for circulating cooling water through the shaft, and a divided field excitation to maintain a constant suspending force acting on the rotor while permitting full variation of the output voltage. The invention is particularly applicable to homopolar generators and will be described with special reference thereto, but certain novel features are also applicable to other kinds of machines such as generators, motors, etc., with vertical shafts.

Dynamo-electric machines of the types mentioned are frequently constructed with a vertical axis. This construction has heretofore required the provision of a thrust bearing to support the rotor. Such bearings are costly and involve considerable maintenance and lubrication. I have invented a dynamo-electric machine having a field structure so constructed that the main field flux exerts a magnetic force tending to lift the rotor off of its support whereby, when rotating under load, it floats in space. A simple, inexpensive thrust bearing requiring little or no lubrication will thus suffice to support the rotor when the machine is unexcited and stationary. I have also invented a novel outlet construction for cooling water circulated through the shaft of the machine. I provide a collar or flange at the upper end of the shaft and a collecting chamber having a conical bottom coaxial with the shaft to prevent water flowing up out of the shaft from leaking down axially through the machine. My invention includes also a divided field winding providing for constant excitation in one magnetic circuit of a double field machine to suspend the rotor, and the variation of the excitation of the other circuit to provide a variation of terminal voltage.

A complete understanding of the invention may be obtained from the following detailed description which refers to the accompanying drawings illustrating a preferred embodiment. In the drawings:

Fig. 1 is an axial section through a vertical-shaft machine having the invention incorporated therein;

Fig. 2 is a portion of Fig. 1 to enlarged scale showing diagrammatically the effect of the field flux in exerting a lifting force on the rotor; and Fig. 3 is a somewhat diagrammatic view similar to Fig. 1 showing a modification.

Referring in detail to the drawings, and, for the present, to Figs. 1 and 2, the machine there shown is a homopolar generator including two alined field structures 10 and 11 in the form of a housing or case with their common axis vertical, cooperating with a single rotor 12 supported at its lower end on a thrust bearing 13 and journaled at its upper end in a bearing 14. The field structures are connected together and are provided with independently energized exciting windings 15 and 16. They are supported on a non-magnetic base 17 having a central seat 18 for the bearing 13. A motor 19 has its stator mounted on the field structure 10 and its armature on the rotor 12, whereby to drive the latter. The motor stator has a central seat 20 for bearing 14 and a collector chamber 21 having a conical bottom, for receiving cooling water flowing upwardly out of a central bore 22 through the rotor. Water is supplied to this bore by a pipe 23 extending downwardly thereinto and connected to a suitable supply. A collar or flange 24 on the upper end of the rotor overhangs the edge of the central hole in the bottom of the chamber 21 through which the rotor extends and serves as a slinger to throw off by centrifugal force toward the vertical wall of chamber 21, the water ascending through the bore 22. An outlet pipe 25 is connected to the chamber 21.

The rotor 12 comprises a cylinder of magnetic metal reduced at its ends to form journals and having laminated rings 26 spaced vertically thereof cooperating with laminated rings 27 seated in the field structures 10 and 11. Inductors 28 spaced circumferentially of the rotor are embedded in slots in the rings 26 and are connected at their ends to collector rings 29 of conducting metal fitting snugly on the rotor. Brushes 30 engaging the rings 29 are mounted on bars 31 spaced circumferentially of the field structures and embedded in the rings 27. The adjacent ends of the bars 31 of the upper and lower halves of the machine are connected to terminal conductor rings 32 extending around the machine, insulated from each other and having radial lugs 32a for the connection of load busbars.

The flux through the magnetic circuits provided by the upper and lower halves of the machine crosses the air gaps between rings 26 and 27. The flux in the field structure 10 also crosses a cylindrical air gap between it and the upper end of the rotor. In order to cause the flux through the lower field structure 11 to exert a lift on the rotor, I make the opening or eye at the bottom of the structure of frusto-conical shape as indicated at 33 and mount a frusto-conical ring, skirt or lifting armature 34 on the lower end of the rotor. As shown more clearly in Fig. 2, the flux induced in the lower half of the machine by field winding 16 tends to cross the air gap 35 at right angles to the surfaces of the opening 33 and armature 34, and is uniformly distributed circumferentially. The flux lines, as is well known, act as if they had a tendency to shorten and thereby exert magnetic attraction between the field structure and the rotor. The vertical component of this force is effective as a lift on the rotor. The force may be accurately evaluated mathematically and depends on the flux density, the area of the gap and the base angle of the conical surfaces 33 and 34. By proper design, therefore, the lift may be made such that, with full excitation, it is just sufficient to lift the rotor weight, thereby relieving the thrust bearing 13 of load. The bearing shown actually comprises a pair of bearings back to back, the lower one supporting the rotor when the field winding 16 is de-energized and the upper one serving to prevent the rotor from rising too far. With proper design, of course, the latter bearing will be loaded but lightly if at all, under any operating conditions likely to exist. If motor 19 is energized only when field winding 16 is energized, the bearings 13 will be preserved from any service under load. The radial load on bearings 13 and 14, of course, is practically zero at all times since the rotor is symmetrical and balanced statically as well as dynamically, and the radial component of the magnetic attraction is uniform in all directions.

The magnetic circuits of the two field structures 10 and 11 are independent and their excitation may be varied by adjusting the current through the windings 15 and 16. I take advantage of this by maintaining the energization of winding 16 constant at a value sufficient to induce the flux needed to float the rotor, i. e., suspend it magnetically in space for free rotation within the two alined field structures, and vary the energization of the winding 15, or even reverse the polarity thereof, to control the output voltage of the machine. This voltage may be varied from a maximum when both field windings are energized fully and in such direction relative to each other that the voltages induced in the inductors add, to a minimum of practically zero when the winding 15 is energized in such direction that the flux in the upper field structure causes the voltage induced thereby to oppose that induced in the inductors by the flux of the lower field structure. This does not involve any change in the latter flux and therefore no diminution of its lifting force.

Fig. 3 shows a modification generally similar to the form of the invention already described except that the airgap at the upper end of the rotor is made conical like that at the bottom, by making the eye of the upper field structure and the upper end of the rotor of frusto-conical shape. Corresponding parts are designated by the same numerals used in Figs. 1 and 2. It will be evident that the modified construction does not permit such exact balancing of the rotor weight magnetically at all times if the output voltage has to be varied or regulated by adjusting the field excitation. In other words, with the modified construction, voltage control necessarily involves some change in the total lift on the rotor which is dependent on the total flux crossing the two conical air gaps.

The lower air gap of the machine shown in Fig. 3 may be made cylindrical instead of frusto-conical. This preserves all the advantages of the machine of Figs. 1 and 2 and affords improved support for the rotor by suspending it from the upper end, leaving the remainder floating freely in space. In this modified form, the thrust bearing 13 and radial bearing 14 might be interchanged.

It will be evident from the foregoing that a dynamo-electric machine according to my invention requires less maintenance and lubrication of the thrust bearing and permits the use of a lower-capacity and less expensive bearing than would otherwise be necessary. Overflowing cooling water, furthermore, is effectively carried off without danger of leaking down through the machine.

Although I have illustrated and described only a preferred form of the invention and a modification, it will be recognized that changes in the details and arrangement disclosed may be made without departing from the spirit of the invention or the scope of the appended claims.

I claim:

1. A homopolar generator comprising a field structure, a rotor journaled therein with its axis vertical, and a winding for exciting the magnetic circuit formed by said structure and rotor, said circuit including cylindrical surfaces on said structure and rotor, respectively, with an air gap therebetween, and adjacent frusto-conical portions with a second air gap therebetween whereby flux crossing said second air gap exerts a magnetic force between said structure and rotor having a component along the rotor axis.

2. A dynamo-electric machine comprising a field structure and a rotor journaled for rotation therein with its axis vertical, said rotor having an axial cooling passage extending downwardly thereinto, a collector chamber adjacent the upper end of the rotor having an opening in its bottom through which said rotor projects, and a flange on said rotor overhanging the edge of said opening.

3. A dynamo-electric machine as defined by claim 2 characterized by the bottom of said chamber being conical.

4. In a homo-polar generator, a rotor journaled with its axis vertical, a field structure in the form of a cage enclosing said rotor and having vertical side portions and a bottom, said bottom having an opening in the center thereof with a frusto-conical wall flaring downwardly, the lower end of said rotor extending through said opening, and a downwardly flaring frusto-conical skirt on said rotor substantially aligned horizontally with said bottom and cooperating therewith to exert a lift on said rotor when said field structure is excited causing magnetic flux to cross the air gap between said wall and said skirt.

5. A generator as defined by claim 4 characterized by a pair of opposed thrust bearings in which the lower end of the rotor is seated, means supporting the lower bearing to carry the load imposed by the weight of the rotor and means holding the upper bearing down thereby limiting the uplift of the rotor when the field structure is excited.

6. A dynamo-electric machine comprising a stationary frame with a field structure therein, a rotor journaled for rotation in the frame with its axis vertical, said rotor having a reduced upper end portion, said rotor having an axial passage therein extending from the top of the rotor downwardly into the rotor, a fluid supply pipe discharging liquid into said passage, a fluid collecting chamber surrounding the reduced upper end of the rotor, a flange member on the upper end of the rotor within said chamber onto which liquid flowing out of said passage is discharged and from the periphery of which it is thrown centrifugally against the walls of the chamber, and an upwardly and inwardly inclined flange on the frame structure extending under the flange on the rotor.

7. A dynamo-electric machine comprising a stationary frame structure with a field mounted therein, a rotor journaled for rotation in said frame structure with its axis vertical, said rotor having a reduced upper end portion, said rotor having an axial passage therein extending from the top of the rotor downwardly into the rotor, a fluid supply pipe discharging in said passage below the top thereof, and cooperating means on the rotor and frame structure for disposing of cooling liquid discharged from the top of said passage in the rotor, said means including overlapping flange elements on the rotor and stationary frame structure.

8. A dynamo-electric machine as defined by claim 7 wherein there is a bearing for the rotor mounted in the frame structure below said overlapping flanges.

9. A dynamo-electric machine comprising a stationary frame structure with a field mounted therein, a rotor journaled for rotation in the frame structure with its axis vertical, said rotor having a reduced upper end portion, said rotor having an axial passage therein extending from the top of the rotor downwardly into the rotor, a cooling liquid supply pipe projecting downwardly into said passage, a flanged element on the upper end of the rotor, and an upwardly and inwardly inclinded flange element on the frame structure which the flange element on the rotor overhangs, said rotor and flanged element thereon being movable vertically in the field structure during operation of said machine.

JAMES V. CAPUTO.

REFERENCES CITED

The following references are of record in the file of this patent:

UNITED STATES PATENTS

| Number | Name | Date |
|---|---|---|
| 457,902 | Kintner | Aug. 18, 1891 |
| 1,039,197 | Roth et al. | Sept. 24, 1912 |
| 1,563,945 | Apple | Dec. 1, 1925 |
| 2,436,939 | Schug | Mar. 2, 1948 |